United States Patent
Jang

(10) Patent No.: US 12,426,757 B2
(45) Date of Patent: Sep. 30, 2025

(54) ROBOT CLEANER AND CONTROL METHOD THEREFOR

(71) Applicant: LG ELECTRONICS INC., Seoul (KR)

(72) Inventor: Hyunjin Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 17/639,660

(22) PCT Filed: Sep. 5, 2019

(86) PCT No.: PCT/KR2019/011435
§ 371 (c)(1),
(2) Date: Mar. 2, 2022

(87) PCT Pub. No.: WO2021/045260
PCT Pub. Date: Mar. 11, 2021

(65) Prior Publication Data
US 2022/0287529 A1   Sep. 15, 2022

(51) Int. Cl.
*A47L 9/28* (2006.01)
*G05D 1/00* (2024.01)
*H04B 1/7163* (2011.01)

(52) U.S. Cl.
CPC .......... *A47L 9/2894* (2013.01); *A47L 9/2842* (2013.01); *A47L 9/2852* (2013.01); *A47L 9/2873* (2013.01); *G05D 1/0221* (2013.01); *A47L 2201/022* (2013.01); *A47L 2201/04* (2013.01); *A47L 2201/06* (2013.01); *H04B 1/7163* (2013.01)

(58) Field of Classification Search
None
See application file for complete search history.

(56) References Cited

U.S. PATENT DOCUMENTS

| | | |
|---|---|---|
| 2016/0274580 A1 | 9/2016 | Jung et al. |
| 2018/0242806 A1 | 8/2018 | Haegermarck |
| 2019/0021568 A1 | 1/2019 | Kim |
| 2019/0038106 A1* | 2/2019 | Jang .................. A47L 11/4005 |

FOREIGN PATENT DOCUMENTS

| | | |
|---|---|---|
| CN | 105686766 | 6/2016 |
| CN | 107256019 | 10/2017 |
| CN | 108125622 | 6/2018 |
| KR | 10-2015-0047893 | 5/2015 |

(Continued)

OTHER PUBLICATIONS

English Machine Translation for KR20180015928A.*

(Continued)

*Primary Examiner* — Kaj K Olsen
*Assistant Examiner* — Pradhuman Parihar
(74) *Attorney, Agent, or Firm* — KED & ASSOCIATES, LLP

(57) ABSTRACT

The present invention relates to a robot cleaner control method comprising: a first step of storing information related to cleaning during which a manual cleaner cleans while being moved by a user; a second step in which the information, stored in the first step, is transmitted to a robot cleaner; and a third step in which the robot cleaner cleans according to the information.

6 Claims, 10 Drawing Sheets

(56) References Cited

FOREIGN PATENT DOCUMENTS

| KR | 20150047893 A | * | 5/2015 | | |
|---|---|---|---|---|---|
| KR | 10-2016-0119500 | | 10/2016 | | |
| KR | 10-2017-0040961 | | 4/2017 | | |
| KR | 10-2018-0015928 | | 2/2018 | | |
| KR | 20180015928 A | * | 2/2018 | | |
| KR | 10-2019-0089794 | | 7/2019 | | |
| KR | 20190089794 | * | 7/2019 | ............... | A47L 9/28 |

OTHER PUBLICATIONS

English Machine Translation for KR20150047893A.*
Korean Office Action dated Apr. 3, 2024 issued in Application No. 10-2022-7003119.
International Search Report and Written Opinion dated Jun. 5, 2020 issued in PCT Application No. PCT/KR2019/011435.
Chinese Office Action dated Aug. 31, 2022 issued in Application No. 201980100091.7.

* cited by examiner

FIG. 9

| Device ID | COORDINATES | TIME | SUCTION FORCE LEVEL | AMOUNT OF DUST |
|---|---|---|---|---|
| A | (1,2,3,4) | 1017101421 | 4 | 20 |
| A | (1,2,3,4) | 1017130211 | 5 | 40 |
| A | (1,1,4,2) | 1017141411 | 2 | 10 |

ROBOT CLEANER AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2019/011435, filed Sep. 5, 2019, whose entire disclosures are hereby incorporated by reference.

TECHNICAL FIELD

The present disclosure relates to a robot cleaner and a method for controlling the same, and more particularly, to a robot cleaner and a method for controlling the same for performing cleaning based on information stored while cleaning is performed by a manual cleaner.

BACKGROUND ART

In general, a cleaner includes a main body having a suction apparatus and a dust container, and a cleaning nozzle connected to the main body to perform cleaning in a state close to a face to be cleaned. The cleaner is divided into a manual cleaner for a user to directly and manually clean the face to be cleaned and a robot cleaner for cleaning the face to be cleaned while the main body travels by itself.

When the user puts the cleaning nozzle on the face to be cleaned while holding the cleaning nozzle or the main body by hand in a state in which the suction apparatus has generated a suction force by a driving force of an electric motor, the cleaning nozzle sucks a foreign substance including dust on the face to be cleaned by the suction force and the sucked foreign substance is collected in the dust container, so that the manual cleaner performs the cleaning of the face to be cleaned. The user may perform the cleaning by adjusting the suction force of the suction apparatus.

In addition, in the robot cleaner, an ultrasonic body and/or a camera sensor, and the like are further installed on the main body equipped with the suction apparatus and the dust container. As the main body automatically travels around the face to be cleaned, the cleaning nozzle sucks the foreign substance on the face to be cleaned by the suction force generated by the suction apparatus and the sucked foreign substance is collected in the dust container, so that the cleaning of the face to be cleaned is performed.

As a prior art, Korean Patent Application Publication No. 20110063285A discloses an operation scheme of a robot cleaner, but the robot cleaner does not perform cleaning in consideration of a user's cleaning pattern or user characteristics.

The user adjusts a suction level and performs the cleaning while moving the manual cleaner based on a propensity. However, the robot cleaner does not perform the cleaning by reflecting the user's cleaning propensity, so that there is a need for improvement of the robot cleaner.

DISCLOSURE

Technical Problem

The present disclosure is to provide a robot cleaner and a method for controlling the same that may store information related to a cleaning pattern of a user in a manual cleaner and may perform cleaning using such information.

In addition, the present disclosure is to provide a robot cleaner and a method for controlling the same that may improve cleaning efficiency by performing cleaning in the same manner as an actual user using a cleaning pattern of the user.

Technical Solutions

In the present disclosure, when using a manual cleaner that must be manually manipulated, the manual cleaner may be used with a UWB module mounted on the manual cleaner to record a cleaning pattern of a user as coordinates using the manual cleaner, so that a robot cleaner may use the corresponding coordinates. A starting coordinate value to be recorded may be a coordinate value of a charging station where the manual cleaner is charged when the manual cleaner is a cordless cleaner. In this connection, the starting coordinate value may be a coordinate value of a robot cleaner charging station.

In the present disclosure, the UWB module may be equipped in each of the manual cleaner, a charger for charging the manual cleaner, and a charger of the robot cleaner. When a user starts cleaning, the charger of the manual cleaner or the charger of the robot cleaner induces to start the cleaning, so that the charger may record the starting coordinates for the first time, and movement coordinates may be recorded every set seconds.

The coordinates may be recorded during the cleaning (suction force ON) with the manual cleaner, and a suction force/whether a dust sensor is turned ON, OFF/a remaining battery level may be recorded together at the time of recording. A time point at which the cleaning is completed may be defined as a time point at which a certain amount of time has elapsed after the manual cleaner is turned ON-OFF, and the stored data may be transmitted to a server.

In addition, the present disclosure allows the user to perform the cleaning in the same pattern as a pattern that the user has performed the cleaning using the manual cleaner, rather than using a basic cleaning mode provided by the robot cleaner when the user performs the cleaning with the robot cleaner. In this connection, related information of the cleaning pattern of the manual cleaner may be stored in the server by being classified into coordinates, a time, and an amount of dust, and the robot cleaner may perform the cleaning with the corresponding information.

That is, when the user sets the robot cleaner to perform the cleaning in a mentoring mode, the robot cleaner is driven using the cleaning information of the manual cleaner.

The present disclosure provides a method for controlling a robot cleaner including a first operation of storing information on cleaning while a manual cleaner for performing the cleaning by being moved by a user is cleaning, a second operation of transmitting the information stored in the first operation to the robot cleaner, and a third operation of performing, by the robot cleaner, the cleaning based on the information.

The information on the cleaning may be information on a movement of the manual cleaner, and the third operation may include performing, by the robot cleaner, the cleaning along a path the same as a moving path of the manual cleaner.

The information on the cleaning may contain an order of cleaning a plurality of partitioned cleaning regions, and the third operation may include performing, by the robot cleaner, the cleaning while moving between the cleaning regions in the same order as the manual cleaner.

The information on the cleaning may contain a path for the manual cleaner to complete cleaning of one region while moving within the corresponding region, and the third operation may include performing, by the robot cleaner, the cleaning along a path the same as the path for the manual cleaner to complete the cleaning of said one region.

The information on the cleaning may contain travel coordinates and a suction level, and the third operation may include performing, by the robot cleaner, the cleaning with the same suction level at the same travel coordinates.

The manual cleaner may be connected to a server through a network, and the information on the cleaning may be stored in the server.

The information on the cleaning may be stored at regular time intervals while the cleaning is performed.

The third operation may be performed when a mentoring mode is selected to be executed by the user.

A UWB module may be installed in the manual cleaner, and coordinate values may be recorded by a UWB module equipped in a charging station of the robot cleaner while the manual cleaner moves while performing the cleaning.

In addition, the present disclosure provides a robot cleaner for performing cleaning based on information on cleaning stored while a manual cleaner for performing the cleaning by being moved by a user is cleaning, the information on the cleaning is information on a movement of the manual cleaner, and the robot cleaner performs the cleaning along a path the same as a moving path of the manual cleaner.

A UWB module may be installed in the manual cleaner, and coordinate values may be recorded by a UWB module equipped in a charging station of the robot cleaner while the manual cleaner moves while performing the cleaning, and the robot cleaner may perform the cleaning using the coordinate values.

Advantageous Effects

According to the present disclosure, cleaning history information of the manual cleaner may be stored and managed on the server. Therefore, the user may identify the cleaning history information and cleaning pattern information thereof through a device such as a smartphone.

In addition, according to the present disclosure, the user may operate the robot cleaner based on the pattern of the cleaning using the manual cleaner. In other words, because the cleaning may be performed with the same coordinates and pattern as those in the case where the cleaning is performed while carrying the manual cleaner, satisfaction with the cleaning may be improved.

In addition, according to the present disclosure, because the stored data is downloaded from the server, there is no need for the robot cleaner to issue a separate command such as specifying a cleaning prohibited zone for the cleaner, so that the cleaning is performed simply.

DESCRIPTION OF DRAWINGS

FIG. 9 is a view illustrating information on cleaning stored while a manual cleaner performs cleaning.

BEST MODE

Figure 1:
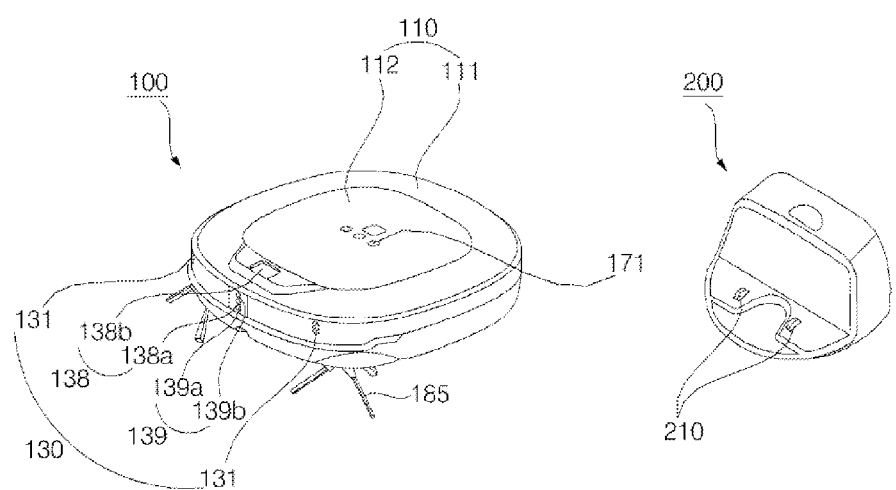
FIG. 1 is a perspective view illustrating a robot cleaner and a charger to which the robot cleaner is docked according to an embodiment of the present disclosure.
Figure 2:
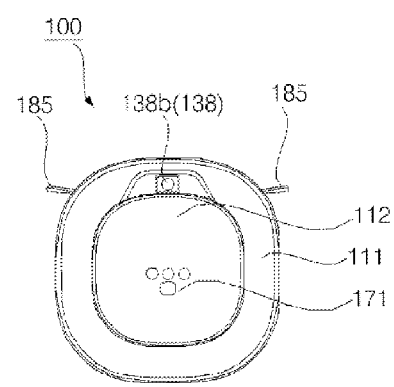
FIG. 2 is a view of a robot cleaner in FIG. 1 viewed from above.
Figure 3:
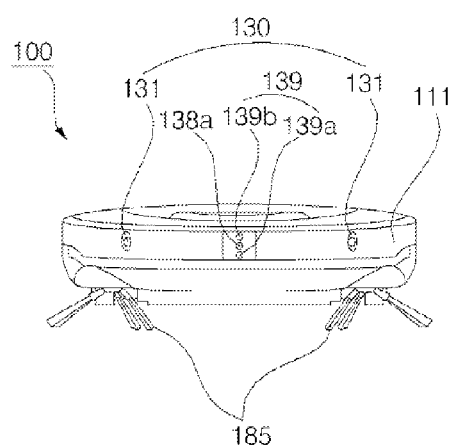
FIG. 3 is a view of a robot cleaner in FIG. 1 viewed from the front.
Figure 4:
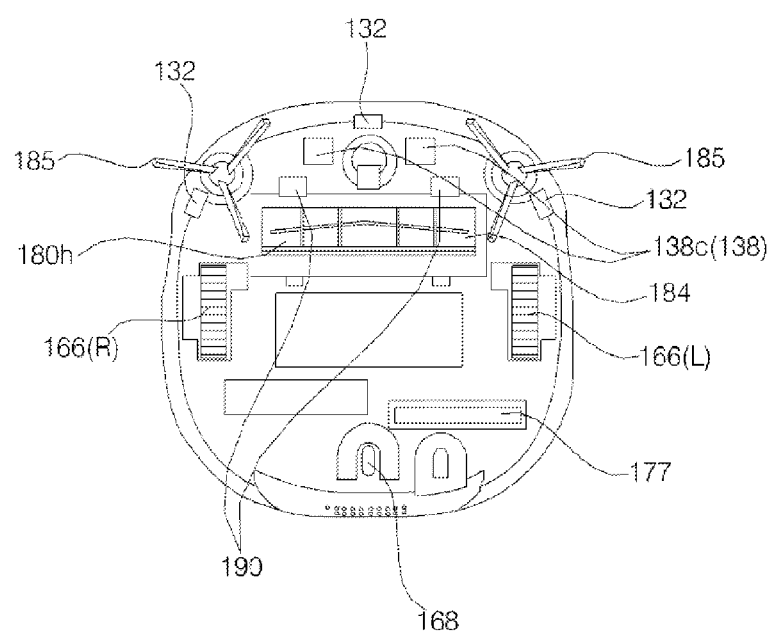
FIG. 4 is a view of a robot cleaner in FIG. 1 viewed from below.
Figure 5:
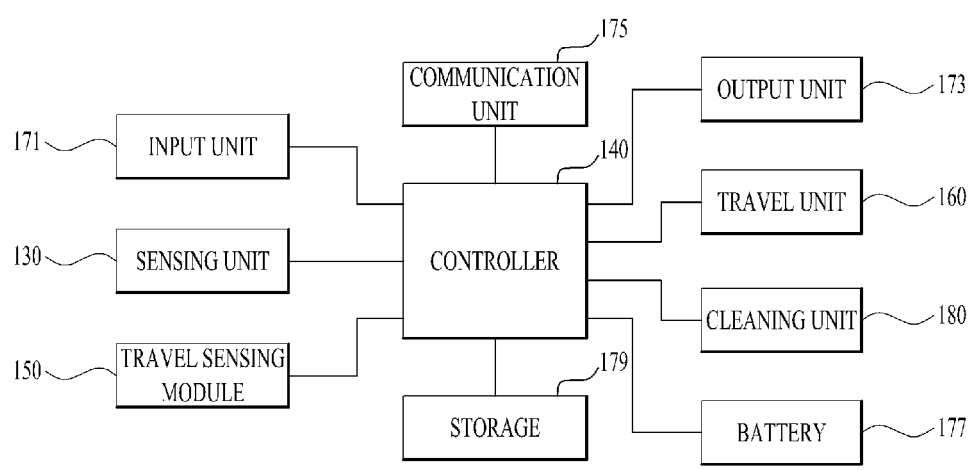
FIG. 5 is a block diagram illustrating a control relationship between main components of a robot cleaner in FIG. 1.

Hereinafter, a preferred embodiment of the present disclosure that may specifically realize the above objects will be described with reference to the accompanying drawings.

In this process, a size, a shape, or the like of a component shown in the drawings may be exaggerated for clarity and convenience of the description. In addition, terms specifically defined in consideration of a configuration and an operation of the present disclosure may vary depending on a user or an operator's intention or practice. Definitions of such terms should be made based on the contents throughout this specification.

Referring to FIGS. 1 to 5, a robot cleaner 100 includes a main body 110. Hereinafter, in defining each portion of the main body 110, a portion facing a ceiling in a travel zone is defined as a top face (see FIG. 2), a portion facing a floor in the travel zone is defined as a bottom face (see FIG. 4), and a portion directed in a travel direction among portions forming a perimeter of the main body 110 between the top face and the bottom face is defined as a front face (see FIG. 3). In addition, a portion directed in an opposite direction to the front face of the main body 110 may be defined as a rear face. The main body 110 may include a casing 111 for defining therein a space in which various components constituting the robot cleaner 100 are accommodated.

The robot cleaner 100 includes a sensing unit 130 that performs sensing to obtain current state information. The sensing unit 130 may perform the sensing during travel. The sensing unit 130 may sense a situation around the robot cleaner 100. The sensing unit 130 may sense a state of the robot cleaner 100.

The sensing unit 130 may sense information about the travel zone. The sensing unit 130 may sense an obstacle such as a wall, furniture, a cliff, and the like on a travel face. The sensing unit 130 may sense a charger 200. The sensing unit 130 may sense information about the ceiling. Through the information sensed by the sensing unit 130, the robot cleaner 100 may map the travel zone.

The sensing unit 130 may include at least one of a distance sensor 131, a cliff sensor 132, an external signal sensor (not shown), an impact sensor (not shown), an image sensor 138, 3D sensors 138a, 139a, and 139b, and a docking sensor for sensing whether docking is successful.

The sensing unit 130 may include the distance sensor 131 that senses a distance to a surrounding object. The distance sensor 131 may be disposed on the front face or a side face of the main body 110. The distance sensor 131 may sense a surrounding obstacle.

A plurality of distance sensors 131 may be arranged.

For example, the distance sensor 131 may be an infrared sensor equipped with a light emitter and a light receiver, an ultrasonic sensor, an RF sensor, a geomagnetic sensor, and the like. The distance sensor 131 may be implemented using an ultrasonic wave, an infrared ray, or the like. The distance sensor 131 may be implemented using a camera. The distance sensor 131 may be implemented with two or more types of sensors.

The sensing unit 130 may include the cliff sensor 132 that senses an obstacle on the floor in the travel zone. The cliff sensor 132 may sense whether a cliff exists on the floor.

The cliff sensor 132 may be disposed on the bottom face of the robot cleaner 100. A plurality of cliff sensors 132 may be arranged. The cliff sensor 132 disposed on a front portion of the bottom face of the robot cleaner 100 may be disposed. The cliff sensor 132 disposed on a rear portion of the bottom face of the robot cleaner 100 may be disposed.

The cliff sensor 132 may be an infrared ray sensor equipped with a light emitter and a light receiver, an ultrasonic sensor, an RF sensor, a location sensitive detector (PSD) sensor, and the like. For example, the cliff sensor may be the PSD sensor, but may be composed of a plurality of different types of sensors. The PSD sensor includes a light emitter that emits an infrared ray on the obstacle and a light receiver that receives the infrared ray that is reflected back from the obstacle.

The sensing unit 130 may include the impact sensor that senses an impact resulted from contact between the robot cleaner 100 and the external object.

The sensing unit 130 may include the external signal sensor that senses a signal transmitted from outside of the robot cleaner 100. The external signal sensor may include at least one of an infrared ray sensor that senses an infrared signal from the outside, an ultrasonic sensor that senses an ultrasonic signal from the outside, and an RF sensor (radio frequency sensor) that senses an RF signal from the outside.

The sensing unit 130 may include the image sensor 138 that senses an image of an outside of the robot cleaner 100.

The image sensor 138 may include a digital camera. The digital camera may include an image sensor (e.g., a CMOS image sensor) including at least one optical lens and a plurality of photodiodes (e.g., pixels) on which an image is focused by light passed through the optical lens, and a digital signal processor (DSP) that composes an image based on signals output from the photodiodes. The digital signal processor is capable of generating a moving image composed of frames composed of still images as well as a still image.

The image sensor 138 may include a front face image sensor 138a that senses an image in a forward direction of the robot cleaner 100. The front face image sensor 138a may sense an image of the surrounding object such as the obstacle, the charger 200, or the like.

The image sensor 138 may include a top face image sensor 138b that senses an image in an upward direction of the robot cleaner 100. The top face image sensor 138b may sense an image such as the ceiling, a bottom face of furniture disposed above the robot cleaner 100, and the like.

The image sensor 138 may include a bottom face image sensor 138c that senses an image in a downward direction of the robot cleaner 100. The bottom face image sensor 138c may sense an image of the floor.

In addition, the image sensor 138 may include a sensor that senses an image in a lateral or rearward direction.

The sensing unit 130 may include the 3D sensors 138a, 139a, and 139b that sense 3D information of an external environment.

The 3D sensors 138a, 139a, and 139b may include a 3D depth camera 138a that calculates a distance between the robot cleaner 100 and an object to be captured.

In the present embodiment, the 3D sensors 138a, 139a, and 139b include a pattern irradiator 139 for irradiating light of a predetermined pattern in the forward direction of the main body 110, and a front face image sensor 138a that acquires an image of a front of the main body 110. The pattern irradiator 139 may include a first pattern irradiator 139a for irradiating light of a first pattern in a forward and downward direction of the main body 110 and a second pattern irradiator 139b for irradiating light of a second pattern in a forward and upward direction of the main body 110. The front face image sensor 138a may acquire an image of a region into which the light of the first pattern and the light of the second pattern are incident.

The pattern irradiator 139 may be disposed to irradiate an infrared pattern.

In this case, the front face image sensor 138a may measure a distance between the 3D sensor and the object to be captured by capturing a shape of the infrared pattern projected on the object to be captured.

The light of the first pattern and the light of the second pattern may be irradiated in a form of straight lines crossing each other. The light of the first pattern and the light of the second pattern may be irradiated in a form of horizontal straight lines spaced from each other in a vertical direction.

The sensing unit 130 may include the docking sensor (not shown) that senses whether the docking of the robot cleaner 100 to the charger 200 is successful. The docking sensor may be implemented to sense by contact between a corresponding terminal 190 and a charging terminal 210, may be implemented as a sensor disposed separately from the corresponding terminal 190, or may be implemented by sensing a state of a battery 177 during charging. A docking success status and a docking failure status may be sensed by the docking sensor.

The robot cleaner 100 includes the battery 177 for supplying driving power to each component. The battery 177 supplies power for the robot cleaner 100 to perform a behavior based on selected behavior information. The battery 177 is mounted in the main body 110. The battery 177 may be disposed to be detachable from the main body 110.

The battery 177 is disposed to be rechargeable. The robot cleaner 100 is docked to the charger 200, so that the battery 177 may be charged through connection of the charging terminal 210 and the corresponding terminal 190. When a charge amount of the battery 177 becomes equal to or below a predetermined value, the robot cleaner 100 may start a docking mode for the charging. In the docking mode, the robot cleaner 100 travels back to the charger 200.

The robot cleaner 100 includes a travel unit 160 that moves the main body 110 with respect to the floor. The travel unit 160 may include at least one driving wheel 166 that moves the main body 110. The travel unit 160 may include a driving motor. The driving wheel 166 may include a left wheel 166(L) and a right wheel 166(R) arranged on left and right sides of the main body 110, respectively.

The left wheel 166(L) and the right wheel 166(R) may be driven by one driving motor, but a left wheel driving motor for driving the left wheel 166(L) and a right wheel driving motor for driving the right wheel 166(R) may be separately arranged as needed. The travel direction of the main body 110 may be switched in a left or right direction by making a difference in rotation speeds of the left wheel 166(L) and the right wheel 166(R).

The travel unit 160 may include an auxiliary wheel 168 that does not provide a separate driving force, but supports the main body against the floor.

The robot cleaner 100 may include a travel sensing module 150 that senses the behavior of the robot cleaner 100. The travel sensing module 150 may sense the behavior of the robot cleaner 100 by the travel unit 160.

The travel sensing module 150 may include an encoder (not shown) that senses a travel distance of the robot cleaner 100. The travel sensing module 150 may include an acceleration sensor (not shown) that senses acceleration of the robot cleaner 100. The travel sensing module 150 may include a gyro sensor (not shown) that senses turning of the robot cleaner 100.

Through the sensing of the travel sensing module 150, the controller 140 may obtain information about a travel path of the robot cleaner 100. For example, based on the rotation speed of the driving wheel 166 sensed by the encoder, information about a current or past travel speed, the travel distance, and the like of the robot cleaner 100 may be obtained. For example, based on a turning direction of each of the driving wheels 166(L) and 166(R), information about a current or past direction switching process may be obtained.

The robot cleaner 100 includes a cleaning unit 180 for performing a predetermined task. The robot cleaner 100 may clean the floor by the cleaning unit 180 while moving in the travel zone. The cleaning unit 180 may suck the foreign substance. The cleaning unit 180 may perform mopping.

The cleaning unit 180 may include a suction apparatus for sucking the foreign substance, brushes 184 and 185 for performing sweeping, a dust container (not shown) for storing therein the foreign substance collected by the suction apparatus or the brushes, and/or a mop for performing mopping (not shown), and the like.

A suction hole 180h into which air is sucked may be defined in the bottom face of the main body 110. The suction apparatus (not shown) for providing a suction force to suck the air through the suction hole 180h and the dust container (not shown) for collecting dust sucked together with the air through the suction hole 180h may be arranged in the main body 110.

An opening for insertion and removal of the dust container may be defined in the casing 111, and a dust container cover 112 for opening and closing the opening may be pivotably disposed with respect to the casing 111.

The task unit 180 may include a roll-type main brush 184 exposed through the suction hole 180h and an auxiliary brush 185 located at a front portion of the bottom face of the main body 110 and including multiple wings extending radially. Rotation of such brushes 184 and 185 removes the dust from the floor in the travel zone, and the dust thus separated from the floor is sucked through the suction hole 180h and collected in the dust container.

The robot cleaner 100 includes the corresponding terminal 190 for charging the battery 177 when being docked to the charger 200. The corresponding terminal 190 is disposed at a location accessible to the charging terminal 210 of the charger 200 in the docking success state of the robot cleaner 100. In the present embodiment, a pair of corresponding terminals 190 are arranged on the bottom face of the main body 110.

The robot cleaner 100 may include an input unit 171 for inputting information. The input unit 171 may receive on/off or various commands. The input unit 171 may include a button, a key, a touch-type display, or the like. The input unit 171 may include a microphone for speech recognition.

The robot cleaner 100 may include an output unit 173 for outputting information. The output unit 173 may inform the user of various information. The output unit 173 may include a speaker and/or a display.

The robot cleaner 100 may include a communication unit 175 that transmits and receives information to and from other external devices. The communication unit 175 may be connected to a terminal device and/or another device located in a specific region in one of wired, wireless, and satellite communication schemes to transmit and receive data.

The communication unit 175 may communicate with a terminal 300, a wireless router 400, and/or a server 500. The communication unit 175 may communicate with other devices such as the terminal 300, another robot cleaner, and the like located in the specific region. The communication unit 175 may receive various command signals from the external device such as the terminal 300 and the like. The communication unit 175 may transmit information to be output to the external device such as the terminal 300 and the like. The terminal 300 may output the information received from the communication unit 175.

The robot cleaner 100 includes storage 179 that stores various information. The storage 179 may include a volatile or a non-volatile recording medium.

A map for the travel zone may be stored in the storage 179. The map may be input by a terminal and the like that may exchange information with the robot cleaner 100 through the communication unit 175 or may be generated by the robot cleaner 100 as the robot cleaner 100 learns by itself. In the former case, the terminal may be exemplified as a remote control, a PDA, a laptop, a smart phone, a tablet, and the like equipped with an application for setting the map.

The robot cleaner 100 includes the controller 140 that processes and determines various information such as mapping and/or recognizing a current location. The controller 140 may control overall operations of the robot cleaner 100 through control of various components of the robot cleaner 100. The controller 140 may map the travel zone through the image and recognize the current location on the map. That is, the controller 140 may perform a simultaneous localization and mapping (SLAM) function.

The controller 140 may receive the information from the input unit 171 and process the received information. The controller 140 may receive the information from the communication unit 175 and process the received information. The controller 140 may receive the information from the sensing unit 130 and process the received information.

The controller 140 may control the communication unit 175 to transmit the information.

The controller 140 may control the output of the output unit 173. The controller 140 may control the driving of the travel unit 160. The controller 140 may control the operation of the cleaning unit 180.

In one example, the charger 200 includes the charging terminal 210 disposed to be connected to the corresponding terminal 190 in the docking success state of the robot cleaner 100. The charger 200 may include a signal transmitter (not shown) for transmitting a guide signal. The charger 200 may be disposed to be placed on the floor.

Figure 6:
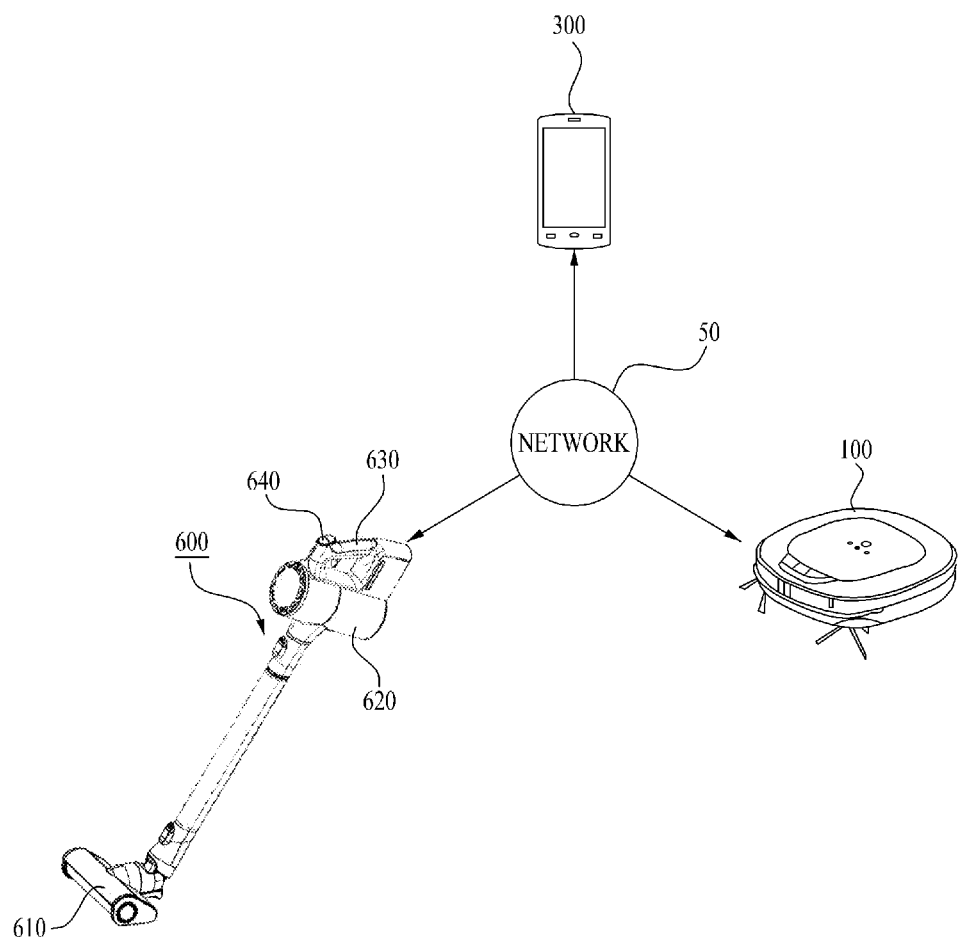
FIG. 6 is a conceptual diagram illustrating a network of a robot cleaner in FIG. 1, a manual cleaner, and a terminal.

As shown in FIG. 6, the manual cleaner 600 used by a person to perform cleaning may be in communication with the terminal 300 and the robot cleaner 100 through a network 50.

The manual cleaner 600 may include a suction nozzle 610 for sucking the foreign substance, a dust container 620 for storing the sucked foreign substance therein, a handle 630, and a manipulator 640.

Through the manipulator 640, the user may adjust a suction force of the suction nozzle 610. That is, the suction force may be increased in a region with a large amount of dust and decreased in a region with a small amount of dust. In addition, another user may adjust the suction force to be strong in the same manner regardless of the amount of dust. Because the manual cleaner 600 performs the cleaning while the user moves the cleaner, cleaning information that reflects a cleaning propensity, a scheme, and the like of the user may be obtained.

The manipulator 640 may include a communication unit capable of communicating with the robot cleaner 100 or the terminal 300 through the network 50. Specifically, an ultra wide band (UWB) module is installed in the manipulator 640, so that information about the movement of the manual cleaner 600 may be recognized. The UWB module capable of sensing a signal transmitted from the manual cleaner 600 may be installed in the charger 200 of the robot cleaner or a separate charger in which the manual cleaner 600 is charged. The robot cleaner 100 shown in FIG. 6 is a concept including the charger 200, and the manual cleaner 600 is a concept including the charger for charging the manual cleaner. In this case, the network 50 may refer to a network through which the signal is transmitted and received by the UWB module.

Figure 7:
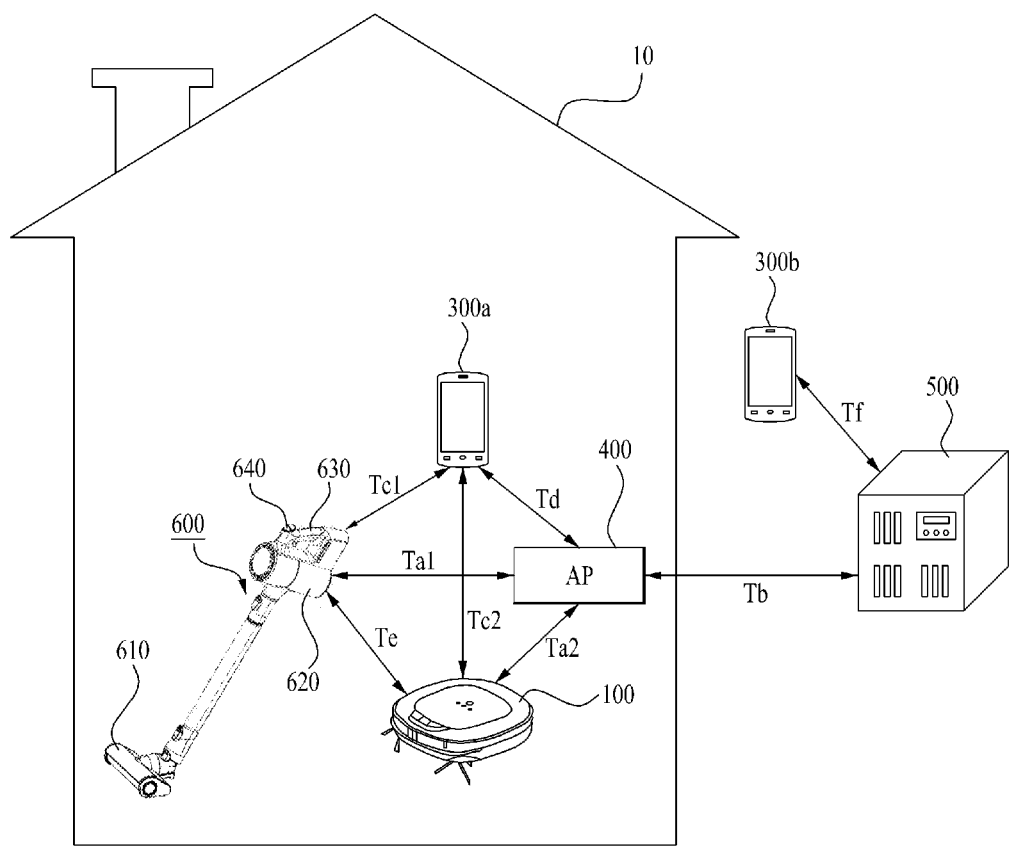
FIG. 7 is a conceptual diagram illustrating an example of a network in FIG. 6.

FIG. 7 is a conceptual diagram illustrating an example of the predetermined network. The robot cleaner 100, the manual cleaner 600, the wireless router 400, the server 500, and mobile terminals 300a and 300b are connected to each other by the network to transmit and receive information with each other.

Referring to Ta1 and Ta2 in FIG. 7, the communication unit 175 of the robot cleaner and the communication unit of the manual cleaner may wirelessly communicate with the wireless router 400. Referring to Tc1 and Tc2 in FIG. 7, the communication unit 175 of the robot cleaner and the communication unit of the manual cleaner may wirelessly communicate with the mobile terminal 300a. Although not illustrated, the communication unit 175 of the robot cleaner and the communication unit of the manual cleaner may wirelessly communicate directly with the server 500. For example, the communication unit 175 may be implemented to wirelessly communicate using wireless communication technologies such as IEEE 802.11 WLAN, IEEE 802.15 WPAN, UWB, Wi-Fi, Zigbee, Z-wave, Blue-Tooth, and the like. The communication unit 175 may vary based on a communication scheme of another device or the server to communicate with.

Through the communication unit 175, status information obtained through the sensing of the sensing unit 130 may be transmitted over the network. The information may be received by the robot cleaner 100 on the network through the communication unit 175, and the robot cleaner 100 may be controlled based on such received information.

The robot cleaner 100, the manual cleaner 600, the wireless router 400, the mobile terminal 300a, and the like may be arranged in a building 10 such as a house. The server 500 may be implemented in the building 10 but may be implemented outside the building 10 as a more extensive network.

The wireless router 400 and the server 500 may include a communication module that may be connected to the network based on a determined communication protocol.

The robot cleaner 100 and the manual cleaner 600 may exchange data with the server 500 through the network. The robot cleaner 100 and the manual cleaner 600 may exchange the data wiredly and wirelessly with the wireless router 400, and consequently exchange the data with the server 500.

In addition, the robot cleaner 100 and the manual cleaner 600 may exchange the data with the terminals 300a and 300b through the network. The robot cleaner 100 and the manual cleaner 600 may exchange the data wiredly and wirelessly with the wireless router 400, resulting in the data exchange with the terminals 300a and 300b. Further, the robot cleaner 100 and the manual cleaner 600 may exchange the data with the terminals 300a and 300b using the Bluetooth and the like without going through the wireless router 400.

In one example, the wireless router 400 may allocate a wireless channel based on a predetermined communication scheme to electronic devices in a predetermined region and perform wireless data communication through the corresponding channel. In this connection, the predetermined communication scheme may be a WiFi communication scheme.

The wireless router 400 may communicate with the robot cleaner 100 and the manual cleaner 600 located within a predetermined region range. The wireless router 400 may communicate with the mobile terminal 300a located within the predetermined region range. The wireless router 400 may communicate with the server 500.

The server 500 may be accessible through Internet. The various terminals 300b connected to the Internet may communicate with the server 500. The terminal 300b may be, for example, a mobile terminal such as a personal computer (PC), a smart phone, and the like.

The server 500 includes a processor capable of processing a program. A function of the server 500 may be performed by a central computer (cloud), but may also be performed by a user's computer or mobile terminal. For example, the server 500 may perform machine learning and/or data mining. The server 500 may perform learning using the collected information.

Referring to Td, Ta1, and Ta2 in FIG. 7, the mobile terminal 300a may be wirelessly connected to the wireless router 400 through the wi-fi and the like. In this case, the mobile terminals 300a and 300b may transmit and receive information to and from a plurality of robot cleaners 100a and 100b via the wireless router 400.

Referring to Tc1 and Tc2 in FIG. 7, the mobile terminal 300a may be wirelessly connected directly to the robot cleaner 100 through the Bluetooth or the like. In this case, the mobile terminal 300a may transmit and receive the information directly with the plurality of robot cleaners 100a and 100b.

Referring to Te in FIG. 7, the plurality of robot cleaners 100a and 100b may be directly and wirelessly connected to each other using the Bluetooth and the like. In this case, the plurality of robot cleaners 100a and 100b may directly transmit and receive information with each other.

Referring to Ta1 and Ta2 in FIG. 7, the plurality of robot cleaners 100a and 100b may indirectly transmit and receive the information with each other via the wireless router 400.

In one example, the network may further include a gateway (not shown). The gateway may mediate the communication between the robot cleaner 100 and the wireless router 400. The gateway may communicate with the robot cleaner 100 wirelessly. The gateway may communicate with the wireless router 400. For example, communication between the gateway and the wireless router 400 may be based on Ethernet or the Wi-Fi.

Figure 8:
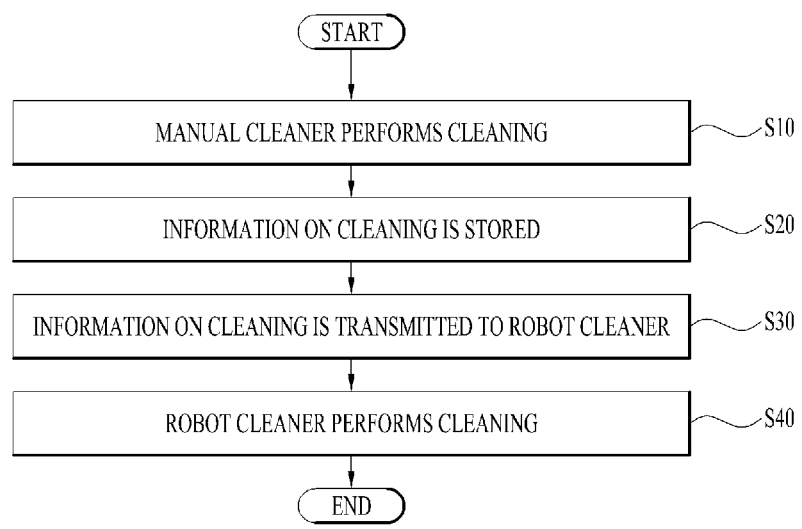
FIG. 8 is a control flowchart according to an embodiment.
Figure 10:
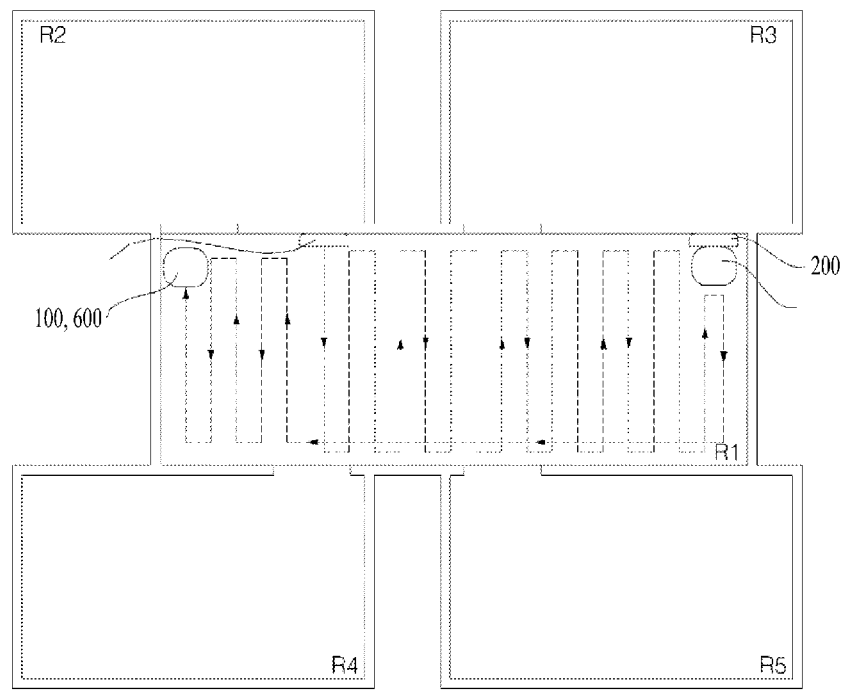
FIG. 10 is a view illustrating a cleaning region.

FIG. 8 is a control flowchart according to an embodiment. FIG. 9 is a view illustrating information on cleaning stored while a manual cleaner performs cleaning. FIG. 10 is a view illustrating a cleaning region.

Referring to FIGS. 8 to 10, the user applies power to the manual cleaner 600, moves the manual cleaner 600 to a region desired to be cleaned, and performs the cleaning (S10).

As shown in FIG. 10, an entire region of the house may be individually divided into regions of R1 to R5. R1 to R5 may mean spaces that may be individually divided, such as a living room, a room, or the like. In some cases, the user may want to clean the entire regions of R1 to R5, or may want to clean only some of the regions of R1 to R5. The user may perform the cleaning by moving the manual cleaner 600 to the region desired to be cleaned among R1 to R5, and driving the manual cleaner 600.

For example, as shown in FIG. 10, the cleaning may be performed in R1. In one example, depending on the user, it is possible to perform the cleaning in one of R2 to R5, not R1. That is, there may be an order regarding which region to select first among the plurality of partitioned R2 to R5. For example, the user may perform the cleaning sequentially from R1 to R5.

In one example, when the user cleans the region of R1 using the manual cleaner 600, the user may perform the cleaning in zigzags in R1 like a dotted line. That is, the user may clean an interior of R1 while moving the manual cleaner 600 in a straight line from a boundary on one side to a boundary on the other side of R1. Depending on a cleaning scheme or a taste of the user, the path the manual cleaner 600 moves may vary even within R1, which is one region.

In this connection, in the manual cleaner 600, coordinates moved in R1 may be recognized by a UWB module, and related information may be stored in the manual cleaner 600 or the server 500 (S20). In one example, the movement coordinates of the manual cleaner 600, as well as the movement path over time and a suction force set by the user at a corresponding position may be recorded by the communication unit installed in the manual cleaner 600. For example, as shown in FIG. 9, a device ID of the manual cleaner may be given as A, and the coordinate value may be changed as the manual cleaner is moved. The change in the coordinate value means a change in the position of the manual cleaner 600. Because the stored information contains a time value, the position of the manual cleaner 600 changes over time, so that the cleaning path of the manual cleaner 600 may be recognized and stored. In addition, because the suction force of the manual cleaner 600 is stored at the corresponding position, a cleaning scheme of the user selecting a different suction force depending on the position may be recognized, and related information thereof may be stored. In addition, when the manual cleaner 600 further includes a dust sensor, an amount of dust sucked at the corresponding position may also be stored together. That is, because various information related to the case in which the user performs the cleaning using the manual cleaner 600 is stored as shown in FIG. 9, information on preferred cleaning scheme or cleaning order of the user may be stored in the manual cleaner or the server and utilized.

In addition, the information on the cleaning may be transmitted to the robot cleaner 100 through the network 50 (S30). The information on the cleaning performed by the user using the manual cleaner may be transmitted to the robot cleaner 100 at a time when the robot cleaner starts the cleaning. That is, the information may be transmitted from the server 500 or the manual cleaner 600 to the robot cleaner 100 at a time when the user turns on the robot cleaner 100 to drive the robot cleaner 100. Otherwise, it is possible to download the information by connecting the robot cleaner 100 to the manual cleaner 600 or the server 500 through the network at regular time intervals. In addition, it is also possible for the user to download the information from the robot cleaner 100 when the user inputs a signal through the terminal 300. In this connection, the user may also use the terminal 300 to identify the information on the cleaning, containing the path where the cleaning was performed using the manual cleaner 600.

After obtaining the information from the robot cleaner 100, the robot cleaner 100 is capable of performing the cleaning in the same manner as the information on the cleaning (S40). For example, as described in S10, when the user first cleans R1, which is a specific region among the plurality of partitioned regions, the robot cleaner 100 may also clean R1 first, not other regions.

In addition, when the user cleans the plurality of regions R1 to R5 in an alphabetical order, the robot cleaner 100 may clean the plurality of regions in the same order. In one example, when the user cleans only R1 and R2, which are some of the plurality of regions, the robot cleaner 100 may also clean only R1 and R2 based on such information. By the coordinates where the cleaning is performed by the manual cleaner 600 while moving, information indicating that the manual cleaner cleaned a corresponding region may be recognized and stored, so that the robot cleaner may also perform the cleaning in the same manner as the cleaning scheme of the user.

As in FIG. 10, when the user performs the cleaning in the region R1 while moving the manual cleaner 600 in zigzags, the robot cleaner 100 may also perform the cleaning while moving in the same path within the region R1. In this connection, because the information on the suction force and the amount of dust are also stored together while the manual cleaner 600 moves, the robot cleaner 100 may perform the cleaning while changing setting to have the same suction force as the manual cleaner 600.

In one example, it is also possible to drive the robot cleaner to have a suction force different from the suction force set by the user. For example, a situation in which, although the user drove the manual cleaner 600 by setting the suction force to be strong at a specific position, it is not necessary for the suction force to be strong because the amount of suctioned dust is small may be considered. In this case, the robot cleaner 100 may also suck dust with a suction force less than the suction force set by the user when using the manual cleaner. Conversely, a situation in which, although the user drove the manual cleaner 600 by setting the suction force to be weak, it is necessary for the suction force to be strong because the amount of suctioned dust is large may be considered. In this case, the robot cleaner 100 may also suck dust with a suction force greater than the suction force set by the user when using the manual cleaner.

That is, the robot cleaner according to the embodiment of the present disclosure may perform the cleaning using the robot cleaner 100 based on the information on the cleaning performed by the user using the manual cleaner 600.

That is, one embodiment may include a first operation in which the information on the cleaning is stored while the manual cleaner 600 that performs the cleaning while being moved by the user is cleaning, a second operation in which the information stored in the first operation is transmitted to the robot cleaner 100, and a third operation in which the robot cleaner 100 performs the cleaning based on the information. The robot cleaner 100 may perform the cleaning in the same manner as the information on the cleaning of the manual cleaner 600. Otherwise, the robot cleaner 100 may perform the cleaning in a different manner by processing the information on the cleaning of the manual cleaner 600.

In this connection, the information on the cleaning is information on the movement of the manual cleaner 600. The robot cleaner 100 may perform the cleaning along a path the same as the path along which the manual cleaner 600 has moved. Specifically, the information on the cleaning may contain the order of cleaning the plurality of partitioned cleaning regions R1 to R5, and the robot cleaner 100 may perform the cleaning while moving between the cleaning regions in the same order as the manual cleaner 600. In addition, the information on the cleaning may contain a path for the manual cleaner 600 to complete cleaning of one region while moving within the corresponding region, and the robot cleaner 100 may perform the cleaning along the same path.

The information on the cleaning may contain travel coordinates and a suction level, and the robot cleaner 100 may perform the cleaning with the same suction level at the same travel coordinates. Therefore, the robot cleaner 100 may perform the cleaning based on a cleaning intention of the user by performing the cleaning at a specific position cleaned by the user using the manual cleaner 600 with the same suction level.

The information on the cleaning may be stored at regular time intervals while the cleaning is performed. The information on the cleaning may be transmitted to the server 500 after being stored in the manual cleaner 600, or may be continuously transmitted to and stored in the server 500 while the manual cleaner 600 is operated. In one example, when the manual cleaner 600 has the UWB module, and the position of the manual cleaner is recognized by the UWB module, the information on the cleaning may be stored in the charger having the UWB module and may be transmitted to the server 500.

In addition, when the user wants the robot cleaner to operate based on the information on the cleaning in S40, the user may select a specific mode in the robot cleaner 100 or the terminal 300 to operate the robot cleaner 100. For example, when the user selects a particular mode referred to as a mentoring mode, it may be determined that the user wants to operate the robot cleaner based on the pattern of the cleaning performed by the manual cleaner, and the robot cleaner 100 may perform the cleaning while operating based on the information on the cleaning.

The present disclosure is not limited to the above-described embodiments. As may be seen from the appended claims, the present disclosure is able to be modified by those of ordinary skill in the field to which the present disclosure belongs, and such modifications are within the scope of the present disclosure.

The invention claimed is:

1. A method for controlling a robot cleaner, the method comprising:
 receiving, by a controller of the robot cleaner, information on cleaning performed by a wireless manual cleaner having a dust sensor while the manual cleaner is being moved by a user, wherein the information on the cleaning performed by the manual cleaner identifies a movement path of the manual cleaner and contains a suction force level and an amount of dust acquired by the dust sensor; and
 managing, by the controller, one or more motors of the robot cleaner based on the information on the cleaning performed by the manual cleaner so that the robot cleaner performs cleaning along a path corresponding to the movement path of the manual cleaner,
 wherein a first ultra wide band (UWB) module is installed in the manual cleaner, and coordinate values are recorded by a second UWB module that is equipped in a charging station of the robot cleaner and in communication with the first UWB module while the manual cleaner moves while performing the cleaning,
 wherein the manual cleaner starts to clean at a charger of the manual cleaner or the charging station of the robot cleaner, and
 wherein managing the one or more motors of the robot cleaner comprises managing a suction force level of the robot cleaner based on the suction force level and the amount of dust acquired by the dust sensor.

2. The method of claim 1,
 wherein the information on the cleaning performed by the manual cleaner identifies an order of the manual cleaner cleaning a plurality of partitioned cleaning regions, and
 wherein the method further comprises managing the one or more motors so that the robot cleaner performs cleaning while moving between the cleaning regions in the order of the manual cleaner cleaning the plurality of partitioned cleaning regions.

3. The method of claim 1,
 wherein the information on the cleaning performed by the manual cleaner identifies a path for the manual cleaner to clean a region while moving within the region, and
 wherein the method further comprises managing the one or more motors so that the robot cleaner performs cleaning along a path corresponding to the path for the manual cleaner to clean the region.

4. The method of claim 1,
 wherein the information on the cleaning performed by the manual cleaner identifies one or more travel coordinates and a suction level of the manual cleaner at each of the one or more travel coordinates, and
 wherein the method further comprises managing the one or more motors so that the robot cleaner performs cleaning with a suction level at each of the at least one of travel coordinates that corresponds to the identified suction level of the manual cleaner at each of the one or more travel coordinates.

5. The method of claim 1,
 wherein managing the suction force level of the robot cleaner comprises managing a suction force level with a suction force level different from the suction force level contained in the received information and set by the user.

6. The method of claim 1,
 wherein when a user performs the cleaning in a region while moving the manual cleaner in zigzags, and the robot cleaner performs the cleaning while moving in a same path within the region.

* * * * *